United States Patent
Neely et al.

(10) Patent No.: US 7,073,662 B2
(45) Date of Patent: Jul. 11, 2006

(54) CONVEYOR BELT AND METHOD OF ASSEMBLY

(75) Inventors: D. Joseph Neely, Winchester, VA (US); Jonathan R. Lasecki, Strasburg, VA (US); Willem van Faassen, Hengelo ov (NL)

(73) Assignee: Ashworth Bros., Inc., Winchester, VA (US)

( * ) Notice: Subject to any disclaimer, the term of this patent is extended or adjusted under 35 U.S.C. 154(b) by 0 days.

(21) Appl. No.: 10/781,857

(22) Filed: Feb. 20, 2004

(65) Prior Publication Data

US 2005/0183936 A1 Aug. 25, 2005

(51) Int. Cl.
*B65G 17/06* (2006.01)

(52) U.S. Cl. ............... 198/850; 198/851; 198/852; 198/853

(58) Field of Classification Search ......... 198/850–853
See application file for complete search history.

(56) References Cited

U.S. PATENT DOCUMENTS

| | | | |
|---|---|---|---|
| 2,270,858 A | 1/1942 | Gallamore | |
| 2,743,003 A | 4/1956 | Allen | |
| 3,066,549 A | 12/1962 | Benjamin | |
| 4,143,512 A | 3/1979 | Templin | |
| 4,815,271 A | 3/1989 | Lapeyre | |
| 4,858,753 A | 8/1989 | Hodlewsky | |
| 4,949,838 A | 8/1990 | Lapeyre et al. | |
| 4,953,693 A | 9/1990 | Draebel | |
| 5,058,732 A | 10/1991 | Lapeyre | |
| 5,070,999 A | 12/1991 | Layne et al. | |
| 5,083,659 A | 1/1992 | Bode et al. | |
| 5,105,938 A | 4/1992 | Tan | |
| 5,332,084 A | 7/1994 | Greve | |
| 5,372,248 A | 12/1994 | Horton | |
| 5,375,697 A | 12/1994 | Battati et al. | |
| 5,419,428 A | 5/1995 | Palmaer et al. | |
| 5,482,156 A | 1/1996 | Damkjær | |
| 5,558,204 A | 9/1996 | Daringer | |
| 5,566,817 A | 10/1996 | Meeker | |
| 5,586,643 A | 12/1996 | Zabron et al. | |
| 5,598,916 A | 2/1997 | Horton et al. | |
| 5,645,160 A | 7/1997 | Palmaer et al. | |
| 5,816,390 A | 10/1998 | Stebnicki | |
| 5,826,705 A * | 10/1998 | Ramsey et al. ............. | 198/853 |
| 5,904,241 A | 5/1999 | Verdigets et al. | |
| 5,960,937 A | 10/1999 | Stebnicki et al. | |
| 5,996,776 A | 12/1999 | van Zijderveld | |
| 6,036,001 A | 3/2000 | Stebnicki et al. | |
| 6,073,756 A | 6/2000 | Damkjær et al. | |
| 6,196,379 B1 | 3/2001 | Van Esch et al. | |
| 6,223,889 B1 | 5/2001 | Layne et al. | |

(Continued)

*Primary Examiner*—Douglas Hess
(74) *Attorney, Agent, or Firm*—Nixon Peabody LLP; Jeffrey L. Costellia

(57) ABSTRACT

A conveyor belt and method for assembling a conveyor belt, the conveyor belt including a plurality of link elements and a plurality of pivot rods. Each link element includes a plurality of intermeshing extensions and at least one edge extension at a peripheral edge thereof. The plurality of intermeshing extensions form receiving compartments adapted to receive intermeshing extensions of an adjacent link element, and include transverse rod openings. The plurality of pivot rods are received in the transverse rod openings of the plurality of intermeshing extensions thereby interlinking adjacent link elements together. The edge extensions include an entry aperture sized to allow insertion of a pivot rod, and a rod receiving compartment to retain an end of the pivot rod.

55 Claims, 9 Drawing Sheets

U.S. PATENT DOCUMENTS

| | | |
|---|---|---|
| 6,227,356 B1 | 5/2001 | Van Zijderveld et al. |
| 6,237,750 B1 | 5/2001 | Damkjaer et al. |
| 6,345,715 B1 | 2/2002 | Palmaer |
| 6,347,699 B1 * | 2/2002 | Ramsey .................... 198/852 |
| 6,364,095 B1 * | 4/2002 | Layne et al. ............... 198/852 |
| 6,382,405 B1 * | 5/2002 | Palmaer .................... 198/853 |
| 6,471,048 B1 * | 10/2002 | Thompson, Jr. et al. .... 198/853 |
| 6,484,379 B1 * | 11/2002 | Palmaer .................... 29/401.1 |
| 6,499,587 B1 | 12/2002 | Greve |
| 6,523,680 B1 | 2/2003 | Guldenfels |
| 6,578,704 B1 * | 6/2003 | MacLachlan ............... 198/778 |
| 6,615,979 B1 | 9/2003 | Etherington et al. |
| 6,644,466 B1 | 11/2003 | Knott et al. |
| 6,732,856 B1 * | 5/2004 | Maine, Jr. .................. 198/850 |
| 6,766,901 B1 * | 7/2004 | Guldenfels et al. ......... 198/837 |
| 6,814,223 B1 * | 11/2004 | Verdigets et al. .......... 198/844.1 |
| 2001/0042677 A1 | 11/2001 | Palmaer |
| 2003/0024794 A1 | 2/2003 | Etherington et al. |
| 2003/0213680 A1 | 11/2003 | Steeber et al. |

* cited by examiner

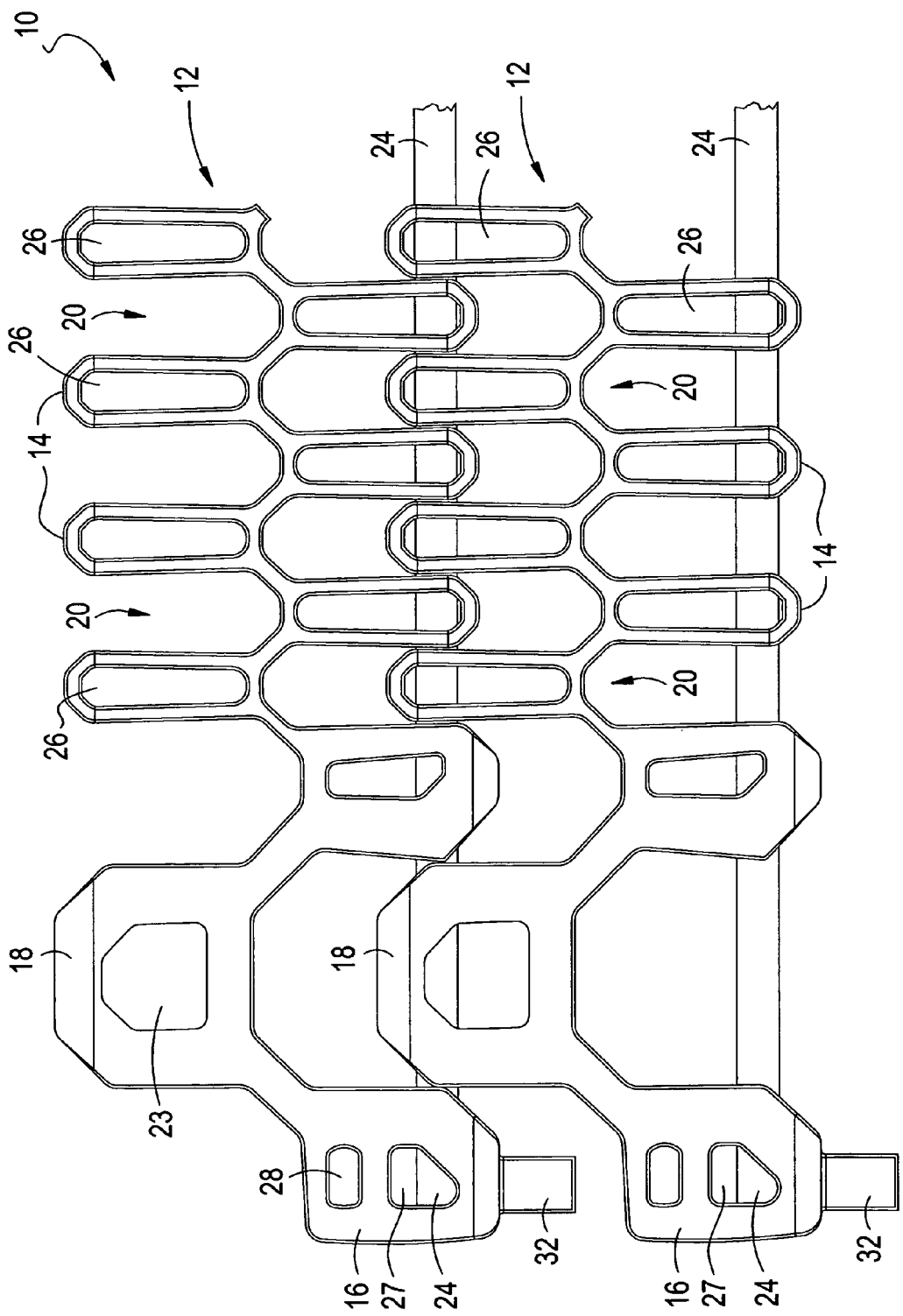

CONVEYOR BELT AND METHOD OF ASSEMBLY

BACKGROUND OF THE INVENTION

1. Field of the Invention

The present invention is directed to conveyor belts, and in particular, to modular conveyor belts. The present invention is further directed to methods for assembling such belts.

2. Description of Related Art

Conveyor systems are commonly used in various industrial fields for material handling and processing purposes. For instance, conveyor systems are used in food processing systems in which food items are placed on the support surface of a conveyor belt and are processed while being conveyed from one location to another. In such applications, the food items may be cooked, baked, frozen, washed, or subject to other processing steps while being conveyed on the conveyor belt. Various different types of conveyor belts have been used in such applications such as wire mesh conveyor belts but various modular belts have become especially popular in food processing systems. Moreover, such conveyor systems are often used in a helical accumulator such as that disclosed in U.S. Pat. No. 5,070,999 to Layne et al. which allows storage of a large number of items in the conveyor system.

Many modular conveyor belts include a plurality of link elements, each link element having a plurality of spaced intermeshing extensions that intermesh with extensions of adjacent link elements. The intermeshed link elements are hingeably interconnected together by elongated pivot rods so as to form a continuous conveyor belt, the plurality of link elements providing the conveying surface. The link elements are generally made of a non-metallic material such as plastic, nylon, or other composite materials. The use of such link elements has become popular especially in food processing applications because the conveyance surfaces are easy to clean and can be treated to resist growth of pathogens such as germs, fungus, viruses and bacteria. In such a manner, modular conveyor belts can aid in the reduction of food borne ailments by improving sanitation.

Various conveyor belts are also known in which pivot rods are inserted into intermeshed link elements, the rods being retained by a feature provided on the link elements. For example, U.S. Pat. No. 5,105,938 to Tan discloses a conveyor belt having links that are interdigitated and pivotably connected by rods, a belt link end being provided on the links that have an aperture with an occlusion to retain the pivot rod in place at one of two bi-stable positions. The patent to Tan discloses a substantially round exit-entrance aperture to allow installation and/or removal of the pivot rod, and a ridge or waist resiliently formed for holding the pivot rod. However, this patent requires the rods to be moved over the ridge via deformation of the ridge which can weaken the links depending on the material from which the links are made. Moreover, inadvertent removal of the rods can occur if the rod is unintentionally moved to a position in which the pivot rod aligns with the exit-entrance aperture.

U.S. Pat. No. 5,598,916 to Horton et al. discloses a modular conveyor belt similar to that disclosed above with respect to Tan, except that the modular conveyor belt links of this reference does not include a ridge. The aperture provided on the belt links allows installation and removal of the rod. However, in this patent, the aperture is offset relative to rod receiving aperture of the links thereby requiring the insertion of the pivot rods at an angle, or alternatively, the use of a bendable pivot rod. The insertion of the pivot rods at an angle is cumbersome and may often be difficult to achieve whereas use of a bendable pivot rod is not desirable in many applications due to reduced strength.

In addition, various other modular conveyor belts have been proposed that provide other integral features, especially at the side edges of the conveyor belt. For example, U.S. Pat. No. 6,523,680 to Guldenfels discloses a modular conveyor belt including edge link ends at the outer periphery of the link elements that nest with other link ends when the conveyor belt is collapsed. U.S. Pat. No. 5,372,248 also to Horton discloses a radius conveyor belt having link elements with projections extending from the edge surface thereof which engage support flanges of side rails to support the conveyor belt during operation. Such support flanges can prevent tenting of the conveyor belt. However, providing side rails for the length of the conveyor belt is cost prohibitive. Moreover, U.S. Pat. No. 6,644,466 to Knott et al. discloses a platform top radius belt in which the modules include protrusions that extend to support an end of the pivot rod, the protrusion fitting between a projecting portion and a narrow hinge element. This patent discloses that the protrusion includes a notch so as to allow the pivot rod to be inserted into the apertures of the hinge elements but does not prevent unintentional removal of the rod.

The above described conveyor belts provide solutions to a variety of different conveyor belt issues such as installation and retention of pivot rods. However, the conveyor belts do not provide an integrated solution to these issues associated with use of conveyor belts. Therefore, there still exists an unfulfilled need for a conveyor belt that provides an integrated solution to such issues. In particular, there still exists an unfulfilled need for a conveyor belt that allows easy installation and retention of pivot rods. In addition, there still exists an unfulfilled need for a conveyor belt that reduces the likelihood of tenting, and provides a mechanism to control the minimum turn radius of a conveyor belt.

SUMMARY OF THE INVENTION

In view of the foregoing, one aspect of the present invention is a conveyor belt that allows easy installation and retention of pivot rods.

Another advantage of the present invention is in providing a conveyor belt that reduces the likelihood of tenting during operation.

Still another advantage of the present invention is in providing a conveyor belt with a mechanism to control the minimum turn radius of the conveyor belt.

Another aspect of the present invention is in providing a method for assembling conveyor belts.

In accordance with one embodiment of the present invention, a conveyor belt is provided comprising a plurality of link elements and a plurality of pivot rods. Each link element includes a plurality of intermeshing extensions and at least one edge extension at a peripheral edge thereof. The plurality of intermeshing extensions form receiving compartments adapted to receive intermeshing extensions of an adjacent link element, and include transverse rod openings. The plurality of pivot rods are received in the transverse rod openings of the plurality of intermeshing extensions thereby interconnecting adjacent link elements together. At least one edge extension of the plurality of link elements includes an entry aperture sized to allow insertion of a pivot rod through the at least one edge extension, and a protrusion that extends to block an entry aperture of an adjacent link element to retain a pivot rod that interlinks a pair of link elements other than the link element on which the protrusion is provided.

In accordance with another embodiment, at least some of the transverse rod openings are slotted openings to allow the plurality of link elements of the conveyor belt to be collapsed together. The edge extension may include a receiving slot defined by an upper flange and a lower flange, the receiving slot being sized to receive a protrusion of an adjacent link element when the link elements are collapsed together.

In addition, the edge extension may further include a rod receiving compartment for receiving an end of a pivot rod therein. The edge extension may further include a transverse obstruction that at least partially defines the rod receiving compartment. In one implementation, the obstruction may be a continuous divider. In another implementation, the obstruction may be one or more projections. The projections may be curved with a radius that is substantially the same as a radius of the pivot rod.

In accordance with another embodiment, the protrusion may be longer than a depth dimension of the receiving slot so as to control the minimum turn radius of the conveyor belt. In addition, a drive extension may be provided, the drive extension having a rod drive opening and a transverse slotted opening having a curved rod surface that receives a pivot rod therethrough.

In another embodiment of the present invention, a conveyor belt is provided in which the link elements include a plurality of intermeshing extensions that form receiving compartments adapted to receive intermeshing extensions of an adjacent link element, each of the plurality of intermeshing extensions including a transverse rod opening therethrough, at least some of the transverse rod openings being slotted openings to allow the plurality of link elements of the conveyor belt to be collapsed together, and at least one edge extension at a peripheral edge of the link element, the edge extension including a protrusion and a receiving slot sized to receive a protrusion of an adjacent link element to interlock adjacent link elements together when the link elements are collapsed together.

In still another embodiment of the present invention, a conveyor belt is provided in which the link elements of the conveyor belt includes a plurality of intermeshing extensions that form receiving compartments adapted to receive intermeshing extensions of an adjacent link element, each of the plurality of intermeshing extensions including a transverse rod opening therethrough, at least some of the transverse rod openings being slotted openings to allow the plurality of link elements of the conveyor belt to be collapsed together, and at least one edge extension at a peripheral edge of the link element, the edge extension including a protrusion that limits the extent to which the link elements of the peripheral edge of the conveyor belt are collapsed thereby defining a minimum turn radius of the conveyor belt.

In yet another embodiment, a conveyor belt is provided in which the plurality of link elements include a plurality of intermeshing extensions that form receiving compartments adapted to receive intermeshing extensions of an adjacent link element, the plurality of intermeshing extensions including transverse rod openings therethrough, at least some of the transverse rod openings being slotted openings, and at least one edge extension at a peripheral edge thereof, the edge extension including a protrusion and an entry aperture sized to allow insertion of a pivot rod through the edge extension, wherein the protrusion prevents removal of a pivot rod when the link elements are collapsed together.

In accordance with yet another embodiment of the present invention, a conveyor belt is provided in which the link elements have a plurality of intermeshing extensions and at least one edge extension at a peripheral edge thereof, the plurality of intermeshing extensions forming receiving compartments adapted to receive intermeshing extensions of an adjacent link element, and including transverse rod openings. The conveyor belt includes a plurality of pivot rods received in the transverse rod openings of the plurality of intermeshing extensions thereby interconnecting adjacent link elements together. The edge extension of at least one of the plurality of link elements includes an entry aperture sized to allow insertion of a pivot rod through the edge extension, and a transverse obstruction that at least partially defines a rod receiving compartment for receiving an end of the pivot rod therein. The transverse obstruction prevents the end of the pivot rod from being forced into the rod receiving compartment from the entry aperture.

In accordance with one embodiment, the obstruction is a continuous divider. In another embodiment, the obstruction is at least one projection. The obstruction may be implemented to transversely extend widthwise across only a portion of the width of the edge extension, or to transversely extend widthwise across the full width of the edge extension. Moreover, in another embodiment, the link elements may be adapted to be stretched transversely to allow the end of the pivot rod to clear the transverse obstruction so that the pivot rod is moveable into the receiving compartment.

In yet another embodiment of the present invention, a conveyor belt is provided in which the link elements have a plurality of intermeshing extensions and at least one edge extension at a peripheral edge thereof, the plurality of intermeshing extensions forming receiving compartments adapted to receive intermeshing extensions of an adjacent link element, and including slotted transverse rod openings. The conveyor belt includes a plurality of pivot rods received in the transverse rod openings of the plurality of intermeshing extensions thereby interconnecting adjacent link elements together. The edge extension of at least one of the plurality of link elements includes an entry aperture sized to allow insertion of a pivot rod through the edge extension, and a transverse obstruction that at least partially defines a rod receiving compartment for receiving an end of the pivot rod therein. The rod receiving compartment is sized larger than the end of the pivot rod to allow the end of the pivot rod to be displaced therein.

In accordance with another aspect of the present invention, a method of assembling a conveyor belt is provided, the method comprising the step of providing a plurality of link elements, each link element having a plurality of intermeshing extensions with transverse rod openings, and at least one edge extension at a peripheral edge thereof that includes an entry aperture and a transverse obstruction that at least partially defines a rod receiving compartment. The method also includes the steps of providing a plurality of pivot rods, intermeshing a pair of adjacent link elements together, and inserting a pivot rod through the entry aperture of one of the intermeshed pair of link elements and through said transverse rod openings to thereby interconnect said intermeshed pair of link elements together. The method further includes the steps of transversely stretching the intermeshed pair of link elements to allow an end of the pivot rod to clear the transverse obstruction, and moving the end of the pivot rod into the receiving compartment. In accordance with another embodiment, the method may further include the step of releasing the stretched intermeshed pair of link elements to allow them to return to normal size.

These and other advantages and features of the present invention will become more apparent from the following detailed description of the preferred embodiments of the present invention when viewed in conjunction with the accompanying drawings.

BRIEF DESCRIPTION OF THE DRAWINGS

FIG. 2 is a topographical view of the conveyor belt shown in FIG. 1.

DETAILED DESCRIPTION OF THE PREFERRED EMBODIMENT

Figure 1:
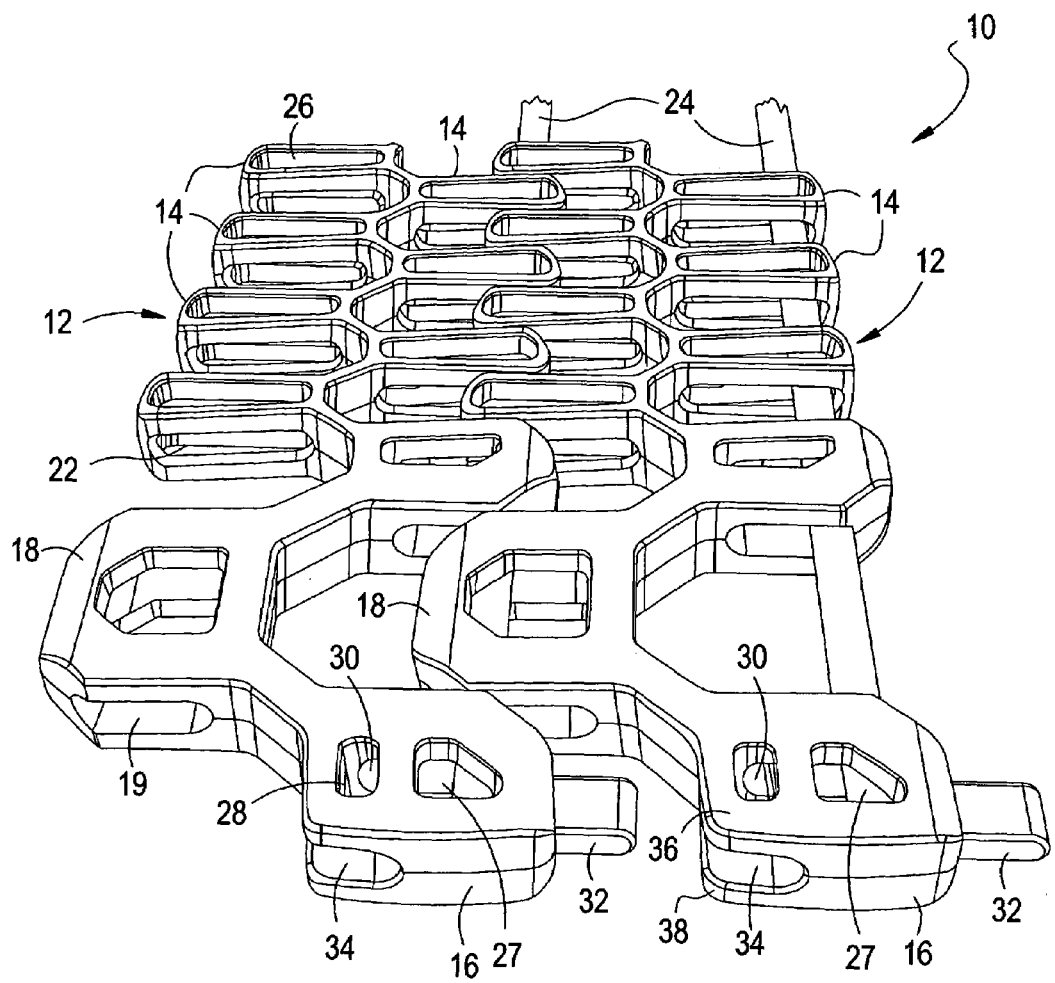
FIG. 1 is a perspective edge view of a segment of a conveyor belt having a pair of link elements in accordance with one embodiment of the present invention.

FIGS. 1 to 7 show various views of a segment of a conveyor belt 10 in accordance with one example embodiment of the present invention which provides an integrated solution to various issues noted previously that is associated with using conveyor belts. As will be described in detail herein below, the conveyor belt 10 allows for easy installation and retention of pivot rods which are used to interconnect a plurality of link elements as described. In addition, conveyor belt 10 as illustrated reduces the likelihood of tenting, and further provides a mechanism for controlling the minimum turn radius of the conveyor belt 10. Various aspects of the present invention, and the advantages thereof, are described herein below in reference to the various figures, especially with respect to FIGS. 1 to 7. However, it should be understood that these figures merely show particular embodiments of the present invention, and that the present invention is not limited to the specific embodiments shown.

As shown in FIGS. 1 to 7, the illustrated embodiment of the conveyor belt 10 comprises a plurality of link elements 12, only two of which are shown for clarity purposes, so that only a segment of the conveyor belt 10 is shown. It should be evident to one of ordinary skill in the art that in actual implementation, many other link elements 12 would be provided to thereby form a continuous conveyor belt 10. In addition, it should also be noted that these figures merely show a segment of the link elements 12 for clarity purposes. In actual implementation, the link elements 12 may be implemented to extend across the transverse width of the conveyor belt 10. Of course, in alternative implementations, multiple link elements may be aligned transversely to thereby span the width of the conveyor belt 10 instead.

Referring again to FIGS. 1 to 7, each link element 12 of the conveyor belt 10 includes a plurality of intermeshing extensions 14, and at least one edge extension 16 at the peripheral edge of the link element 12. In addition, in the illustrated embodiment, the link elements 12 are further provided with drive extensions 18 which are used to drive the conveyor belt 10 as described below. The intermeshing extensions 14 of the link elements 12 extend in both, forward and backward directions of the link element 12, and are spaced so as to form receiving compartments 20 that are sized to receive intermeshing extensions of an adjacent link element, for example, in the manner most clearly shown in FIG. 2.

In addition, the intermeshing extensions 14 further include transverse rod openings 22 which transversely extend across the width of the link element 12. The transverse rod openings 22 are sized to receive pivot rods 24, thereby interconnecting intermeshing extensions 14 of adjacent link elements 12 together in the manner shown in FIGS. 1 and 2. The pivot rods 24 of the illustrated embodiment are implemented as rigid rods which may be made of any appropriate material such as stainless steel. In addition, in the illustrated embodiment, the pivot rods 24 are headless, i.e. are not provided with any structural features at the ends thereof, so as to minimize manufacturing costs and to allow insertion of either end of the pivot rods 24 to interconnect a plurality of link elements 12 together. Of course, in other embodiments, different pivot rods may be used, for example, pivot rods that are flexible and/or are provided with head features.

In the present embodiment, the transverse rod openings 22 are implemented as slotted openings as shown in FIG. 1. Because the intermeshing extensions 14 are provided with slotted openings, adjacent link elements 12 of the conveyor belt 10 may be collapsed together in a nesting manner as more clearly shown in FIGS. 4 and 5. This allows the conveyor belt 10 to negotiate turns along its path by allowing one edge of the conveyor belt 10 to be collapsed while the other edge of the conveyor belt 10 is extended, for example, as shown in FIG. 1. Of course, it should be understood that these figures show intermeshing extensions 14 which extend in both forward and backward directions being provided with slotted openings. In other implementations, the intermeshing extensions 14 extending in only one direction may be provided with slotted openings to allow adjacent link elements to be collapsed together and to provide turn capability.

In the illustrated embodiment of the present invention, the intermeshing extensions 14 of the link elements 12 are further provided with vertical openings 26 as most clearly shown in FIG. 2. The vertical openings 26 allow, for example, gases, water, or other liquid to be flowed through the conveyor belt 10 to the items that are supported on the conveyor belt 10 for processing of the conveyed items. For example, water may be flowed through the conveyor belt for washing the items conveyed. However, provisions of such vertical openings 26 are optional and in other embodiments, the intermeshing extension 14 may be provided with closed surfaces that support the items that are being conveyed on the conveyor belt 10.

Figure 4:
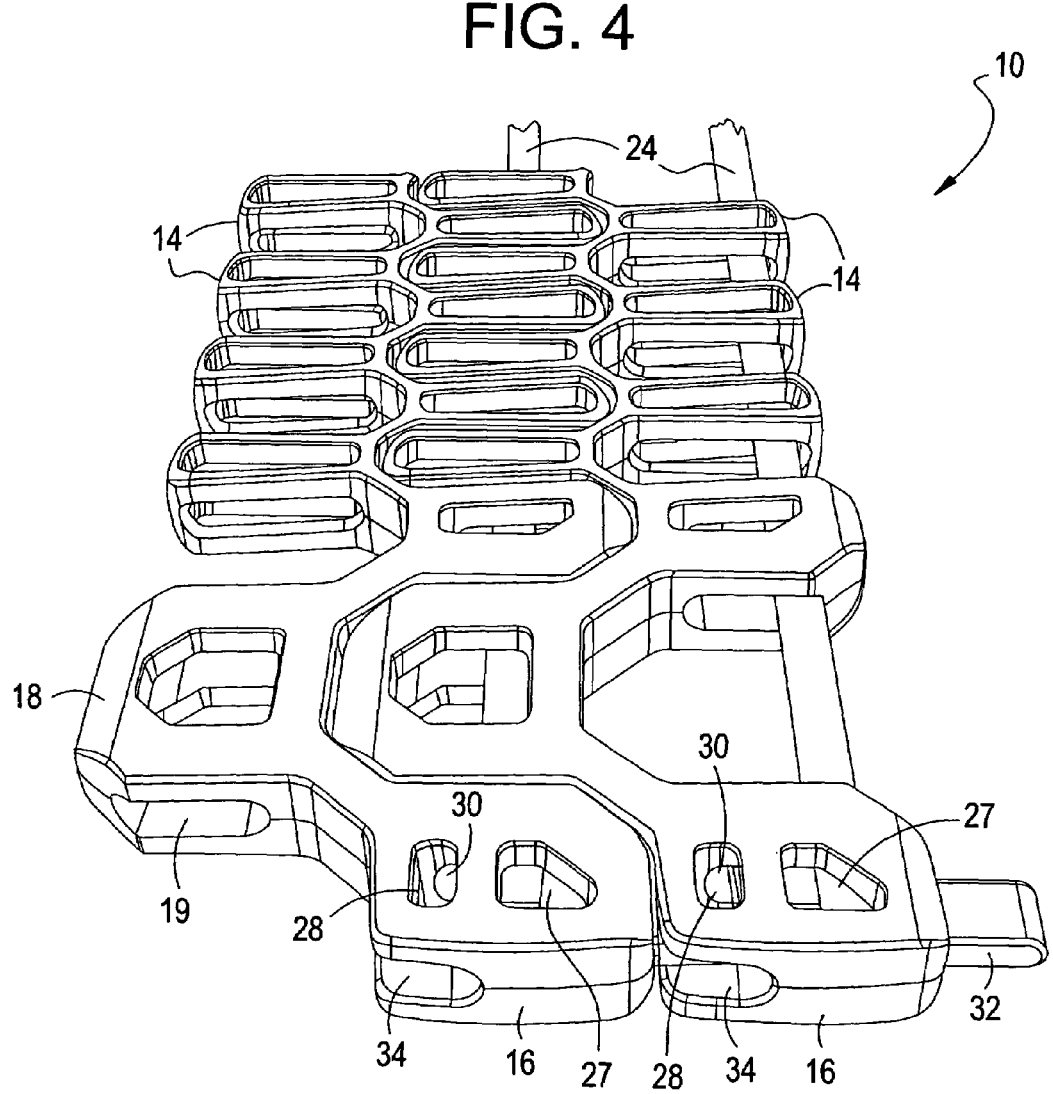
FIG. 4 is a perspective edge view of the conveyor belt shown in FIG. 1 in which the link elements have been collapsed together.
Figure 6:
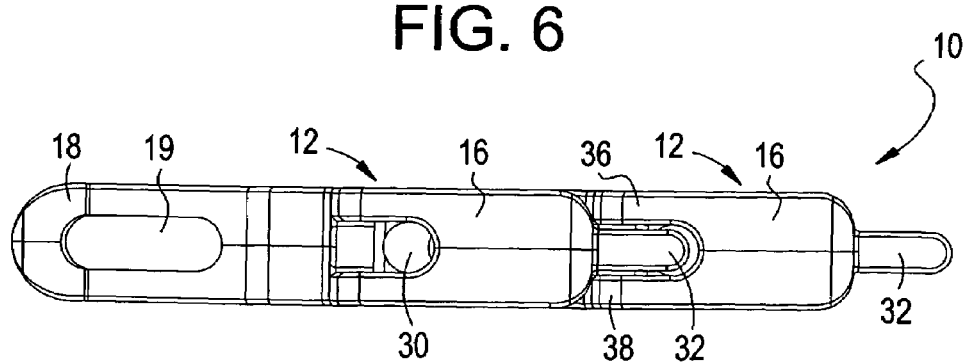
FIG. 6 is an edge view of the conveyor belt shown in FIG. 4.
Figure 5:
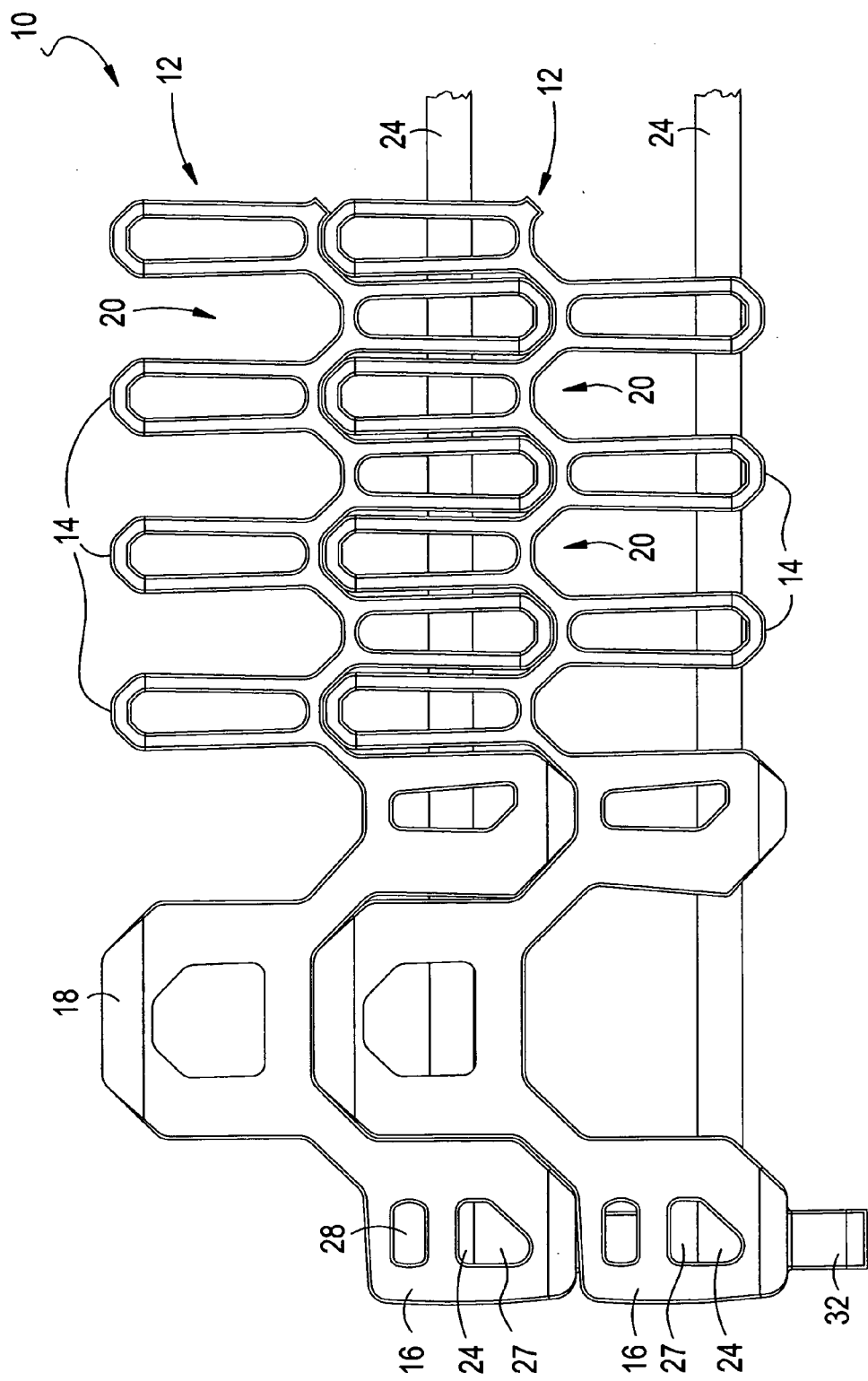
FIG. 5 is a topographical view of the conveyor belt shown in FIG. 4.

As most clearly shown FIGS. 1 and 4, the drive extensions 18 of link elements 12 are provided with rod openings 19 for receiving the pivot rods 24 that are passed therethrough. In this regard, in accordance with the illustrated embodiment, the rod openings 19 are implemented as slotted openings to allow adjacent link elements 12 to be collapsed together, as shown in FIGS. 4 to 6. In addition, the rod openings 19 are provided with a curved surface 21 which facilitates the movement of the link element 12 relative to the pivot rod 24. In particular, the curved surface 21 provides a contact surface for the pivot rod 24 as the conveyor belt 10 navigates a turn. The curved surface 21 reduces the stresses on the link element 12 when adjacent link elements 12 are angled.

The drive extensions 18 also include drive openings 23 through which access to the pivot rods 24 is provided. This allows a drive mechanism such as the drive wheel (not shown) to engage the pivot rods 24, and drive the conveyor belt 10. In this regard, as previously noted, the pivot rod 24 of the illustrated embodiment is made of a substantially rigid material such as stainless steel or other appropriate material sufficient to interconnect the link elements 12 in the manner previously described, and to further allow driving of the conveyor belt 10.

Of course, the above described features of the conveyor belt 10 is provided as an example only and other embodiments of the conveyor belt in accordance with the present invention need not be provided with each of the features described relative to the present embodiment, but may be provided with any selection or combination of features. In this regard, in other embodiments, the conveyor belt may be driven in an alternate manner which does not require drive extensions or engagement to the pivot rods 24. Thus, the mechanism for driving the conveyor belt 10, as described above, should be merely an example of one implementation.

In accordance with the embodiment of the present invention as shown in FIGS. 1 to 7, the link elements 12 of the conveyor belt 10 are further provided with edge extensions 16 that have surface openings 27 and 28 on the conveying surface, and various other features which are described in further detail below. These features provided on the edge extensions 16 allow easy installation and retention of the pivot rods 24 of the conveyor belt 10. In addition, these features also minimize the occurrence of tenting while further providing a mechanism to control the minimum turn radius of the conveyor belt 10.

In the above regard, the edge extensions 16 are provided with entry apertures 30 that are sized to allow insertion of the pivot rods 24 through the edge extension 16 and to be received within the transverse rod openings 22 of the intermeshed link elements 12. As described in detail below, the ends of the pivot rods 24 are retained in the edge extensions 16 by a transverse obstruction so as to reduce the potential for unintentional removal of the pivot rods 24. In addition, the surface openings 27 provided on the conveying surface of the edge extensions 16 in the illustrated embodiment are sized to show at least a portion of the pivot rods 24 when the pivot rods 24 are retained in the edge extensions 16 as most clearly shown in FIGS. 2 and 5. Further, surface openings 28 also provided on the conveying surface of the edge extensions 16 in the illustrated embodiment are positioned above the entry apertures 30 as most clearly shown in FIGS. 1, 4, and 7. Moreover, the edge extensions 16 of the illustrated embodiment are provided with protrusions 32 at one end thereof which block the entry apertures 30 of adjacent link elements when adjacent link elements 12 are collapsed together in the manner shown most clearly in FIGS. 4 and 6. In this regard, in the illustrated embodiment, the entry apertures 30 are provided within receiving slots 34 which, in the present embodiment, are defined by an upper flange 36 and a lower flange 38 that extend from the edge extensions 16. As can be appreciated by examination of FIG. 6, the receiving slot 34 is sized to receive the protrusion 32 of an adjacent link element 12 when the link elements 12 are collapsed in the manner shown in FIG. 4. During assembly of the conveyor belt 10, when the link elements 12 are interconnected together, the pivot rods 24 can easily be inserted into the entry aperture 30 and through the rod opening 19 of the drive extension 18, as well as the transverse rod openings 22 of the intermeshed link elements 12.

Figure 7:
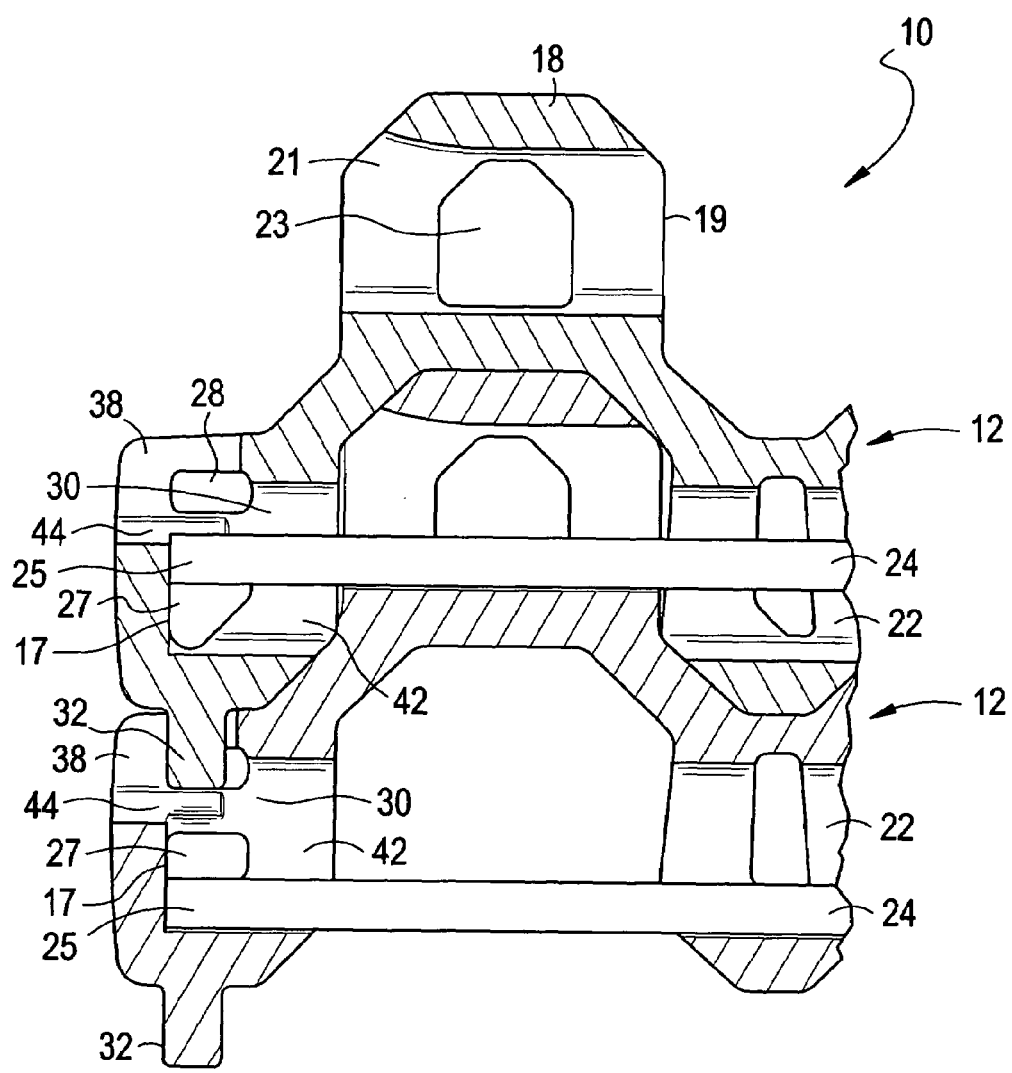
FIG. 7 is a cross sectional view of the conveyor belt as shown in the topographical view of FIG. 5.

FIG. 7 shows a cross section of the conveyor belt 10 which more clearly illustrates the various features of the link elements 12 in accordance with the illustrated embodiment, and how the present embodiment functions when the link elements 12 are collapsed together in the manner shown. The extensions of the link elements 12 are implemented with slotted openings to allow the link elements 12 to be collapsed together in the manner shown. As previously described, the edge extension 16 of the link elements 12 are provided with entry apertures 30 through which the pivot rods 24 are inserted to thereby interconnect adjacent intermeshing link elements 12 together. The ends 25 of the pivot rods 24 are received in a rod receiving compartment 42 that is defined in the edge extension 16 of the link elements 12.

As noted, the edge extensions 16 of the link elements 12 include at least one transverse obstruction 44 that extends transversely widthwise on the edge extension 16, and at least partially defines the rod receiving compartment 42. The transverse obstruction 44 may be implemented as one or more projections (FIG. 7 showing only one projection which is adjacent to the lower flange 38) which extend transversely across at least a portion of the width of the edge extension 16. The transverse obstruction 44 retains the end of the pivot rod 24 in the rod receiving compartment 42 and prevents the pivot rod 24 from being unintentionally removed through the entry aperture 30 which would cause the conveyor belt 10 to fail. In the illustrated embodiment, the rod receiving compartment 42 is sized larger than the end of the pivot rod 24. This allows the end of the pivot rod 24 to be displaced within the rod receiving compartment, for example, when the conveyor belt is collapsed during a turn. In the illustrated embodiment, the dimension of the end of the pivot rod 24 corresponds to the diameter of the pivot rod 24 itself. However, in embodiments where a head feature is provided, the dimension of the end of the pivot rod would be different than the diameter of the pivot rod.

The transverse obstruction 44 shown is curved upwardly with a radius that is substantially the same as the radius of the pivot rod 24. Of course, in other embodiments, the obstruction may be implemented with any appropriate shape, and need not be provided with a curved shape. The obstruction may alternatively be implemented as a continuous divider that partially defines the rod receiving compartment 42. However, by providing an obstruction which is curved with a radius that is substantially the same as the radius of the pivot rod 24, the movement of the pivot rod 24 within the receiving compartment 42 may be facilitated thereby enhancing the durability of the link elements 12, while improving the manufacturability of the link elements 12.

During assembly, the link elements 12 on the conveyor belt 10 are intermeshed together so that the rod opening 19 of the drive extension 18 and the transverse rod openings 22 of the intermeshing extensions 14 are aligned with the entry aperture 30 of an adjacent, interconnecting link element 12. The pivot rods 24 are inserted through these openings to thereby interconnect the adjacent link elements 12 together. The ends 25 of the pivot rods 24 are then moved into the receiving compartment 42. In one embodiment, this may be attained by moving the ends 25 of the pivot rods 24 past the obstruction 44 and into the receiving compartment 42. The obstruction 44 is preferably made so as to prevent movement of the end 25 of the pivot rod 24 through the obstruction 44 and into the rod receiving compartment 42. In this regard, the obstruction 44 may be implemented as one or more discontinuous projections that are appropriately sized and rigid to prohibit the pivot rod 24 from being pushed from the entry aperture 30 into the rod receiving compartment 42. In another embodiment, the obstruction may be implemented as a continuous wall that defines the rod receiving compartment. In accordance with another embodiment, the obstruction 44 may be implemented as a discontinuous projection which are sized and sufficiently compliant to allow the pivot rod 24 to be forcefully pressed through the obstruction from the entry aperture 30 and into the rod receiving compartment 42.

In the above described embodiment in which the obstruction 44 prevents the end 25 of the pivot rod 24 from passing therethrough, the link elements 12 are adapted to be stretched a small distance in the transverse width direction so that the width of the conveyor belt 10 is slightly increased, and the ends 25 of the pivot rods 24 can then be moved around the obstruction 44 and into the rod receiving compartment 42. As can be seen in FIG. 7, the transverse obstruction 44 of the illustrated embodiment is dimensioned to only partially extend along the transverse width of the edge extension 16. The link elements 12 thus, need only to be stretched slightly during installation of the pivot rods 24 in order for the end of the pivot rod 24 to clear the transverse obstruction 44 so that the pivot rod 24 can be received in the receiving compartment 42. Of course, in other embodiments, the transverse obstruction may be dimensioned to fully extend the transverse width of the edge extension 16. In such instances, the link elements 12 may be adapted to be stretched sufficiently for the ends of the pivot rod to clear the transverse obstruction.

In this regard, the pivot rods 24 are correspondingly sized in length so that the pivot rods 24 are slightly longer than the dimension between the ends of the transverse obstructions of the edge extensions at the opposite edges of the link element 12, but smaller than the dimension between the edge walls 17 of the receiving compartments 42 of these edge extensions so that the two ends of the pivot rods 24 can be received within the receiving compartments 42 at the opposite edges of the link element 12. The slight stretching of the link elements 12 is made possible by the fact that the link elements 12 are preferably made of a slightly deformable plastic or other appropriate material. For example, the link elements 12 may be made of plastic such as acetal, polyethylene, polypropylene, and/or nylon. Of course, other appropriate materials may be used. In addition, such installation of the pivot rods 24 would be equally effective in the implementations where the obstruction 44 is implemented as a continuous divider.

Figure 3:
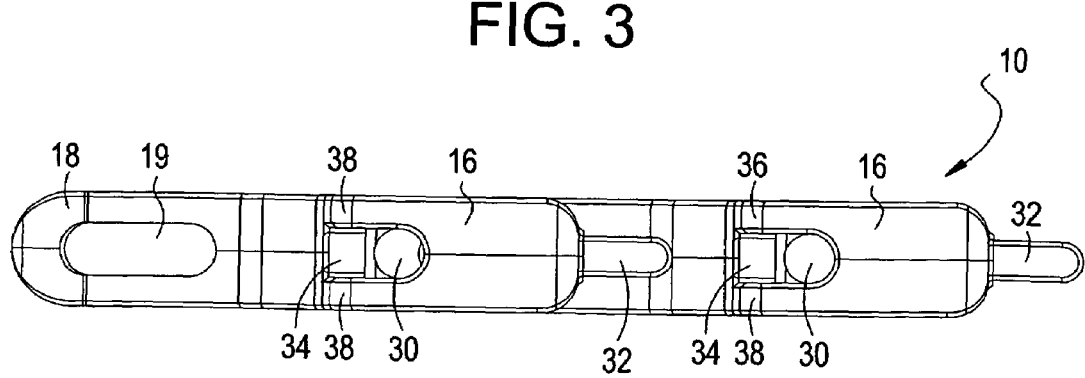
FIG. 3 is an edge view of the conveyor belt shown in FIG. 1.

It should be evident to one of ordinary skill in the art that the pivot rod 24 would clearly be positioned within the rod receiving compartment 42 when the link elements 12 are expanded and positioned away from each other as shown in FIGS. 1 to 3. In such a configuration, the pivot rods 24 are not aligned with the entry apertures 30 of the edge extensions 16, but are instead, retained in rod receiving compartments 42 of the edge extensions 16, as noted.

However, in the instance where the conveyor belt 10 is negotiating a turn or the link elements 12 are otherwise collapsed together, there is a possibility that the pivot rod 24 may move toward the entry aperture 30 and be aligned therewith so that the pivot rod 24 can be unintentionally removed through the entry aperture 30, thereby disconnecting the link elements 12 and causing the conveyor belt 10 to fail. Thus, in accordance with the present embodiment as most clearly shown in FIG. 7, when adjacent link elements 12 are collapsed together, the optional protrusion 32 provided on the edge extension 16 blocks the entry aperture 30 of the adjacent link element 12. In this manner, the protrusion 32 prevents unintentional removal of the pivot rods 24 when the link elements 12 are collapsed together, for example, when the conveyor belt 10 is negotiating a turn.

Referring again to FIG. 6, the receiving slot 34 provided on the edge extension 16 and defined by the upper flange 36 and the lower flange 38 is sized to receive the protrusion 32 of an adjacent link element 12 when the link elements 12 are collapsed together in the manner shown. In addition to blocking the entry aperture 30 to retain a pivot rod 24 as described above, the present implementation further prevents "tenting" of the adjacent link elements 12. Tenting occurs between two or more link elements when the interconnected link elements buckle upward along the pivot rod so that the link elements are inclined with the pivot rod at the apex. As can be appreciated, conveyor belts are prone to tenting when the link elements of the conveyor belt which are pivotally connected by pivot rods, are collapsed together and forcefully pushed together. When tenting occurs, the link elements no longer provide a substantially flat conveying surface, but rather an upward triangulated sloped surface of two or more link elements.

The embodiment of the present invention, as shown in FIGS. 1 to 7 in which the edge extension 16 is provided with a receiving slot 34 for receiving a protrusion 32 of an adjacent link element 12, prevents tenting in the conveyor belt 10. In particular, tenting is prevented in the illustrated embodiment since the upper flange 36 and the lower flange 38, defining the receiving slot 34, prevents the angular movement of the protrusion 32 of the adjacent link element 12 when the protrusion 32 is received within the receiving slot 34. Thus, as the adjacent link elements 12 in the conveyor belt are collapsed together, each of the collapsed link elements 12 are interlocked together and prevented from tenting with respect to the adjacent link element via the receiving slot 34 and the protrusion 32.

It should be further noted that, in accordance with the illustrated embodiment of the present invention, and as most clearly shown in FIG. 7, the protrusion 32 provided on a particular link element 12 blocks an entry aperture 30 of an adjacent link element to retain a pivot rod 24 that interlinks the adjacent link element together with another link element. In other words, the protrusion that extends from the edge extension of a particular link element blocks an entry aperture of an adjacent link element to retain a pivot rod that interlinks a pair of link elements other than the link element on which the protrusion is provided. This feature is described in further detail below.

Figure 8:
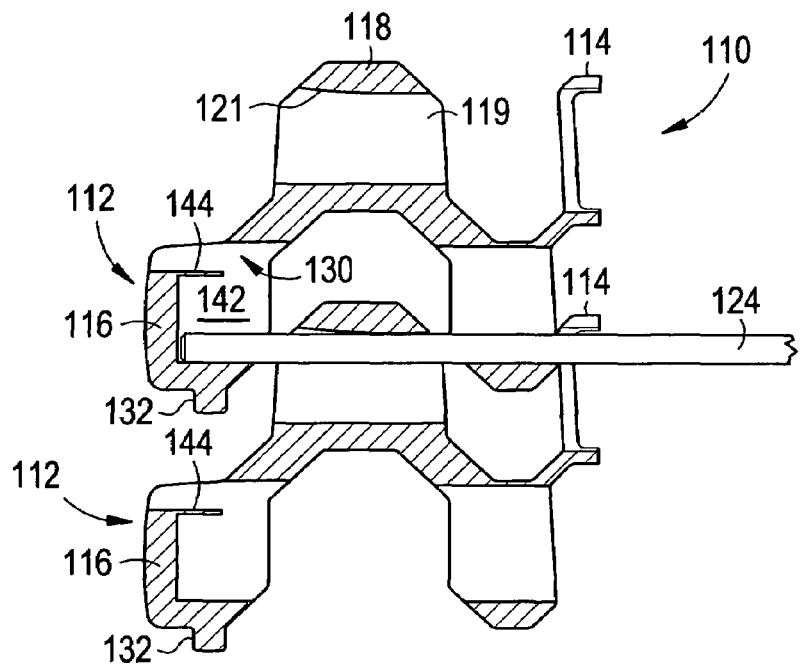
FIG. 8 is a topographical cross sectional view of a segment of a conveyor belt having link elements in accordance with another embodiment of the present invention.
Figure 9:
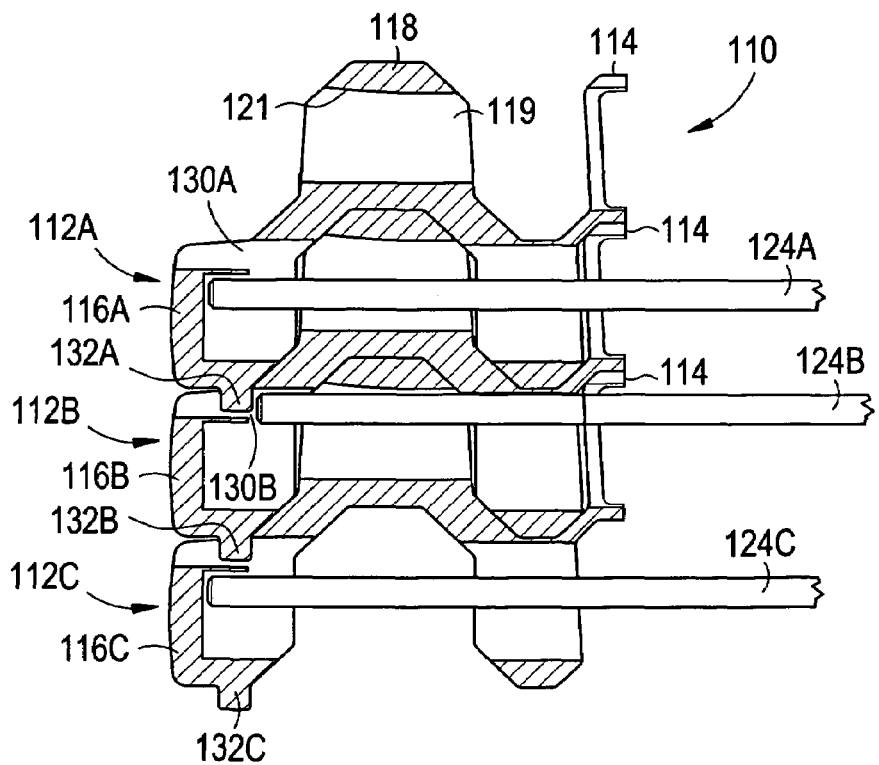
FIG. 9 is the conveyor belt of FIG. 8 in which the link elements have been collapsed together.

FIGS. 8 and 9 show a cross-sectional view of a conveyor belt 110 in accordance with another implementation of the present invention. In this regard, conveyor belt 110 is substantially similar to the embodiment shown in FIGS. 1 to 7 discussed above. Therefore, discussion of various details regarding the conveyor belt 110 which are the same as the previous embodiment discussed above are omitted herein to avoid repetition. As can be clearly seen, the primary distinction between the embodiment shown in FIG. 8 and the embodiments discussed above relative to FIGS. 1 to 7 is that the edge extension 116 of the link elements 112 are provided with obstructions 144 which are implemented as a continuous divider, the obstructions 144 partially defining the receiving compartment 142 that receives the ends of rods 124.

In FIG. 9, each of the components of the conveyor belt 110 are further enumerated with suffixes to more clearly describe the feature of the present invention. As shown, the protrusions 132A–132C provided on the edge extensions 116A–116C of the link elements 112A–112C extend to block entry apertures 130A–130C of an adjacent link element to thereby retain a pivot rod that interlinks a pair of link elements other than the link element on which the protrusion is provided. In particular, the protrusion 132A, that is provided on edge extension 116A of link element 112A, extends to block entry aperture 130B of link element 112B to thereby retain pivot rod 124B, the pivot rod 124B interconnecting link elements 112B and 112C, but not link element 112A on which protrusion 132A is provided. Of course, this blocking feature may be implemented in a different manner in other embodiments. However, the present implementation is advantageous in that it allows the entry aperture 130A–130C to be unimpeded during the assembly of the conveyor belt 110 to facilitate insertion of the pivot rods 124A–124C.

Figure 10:
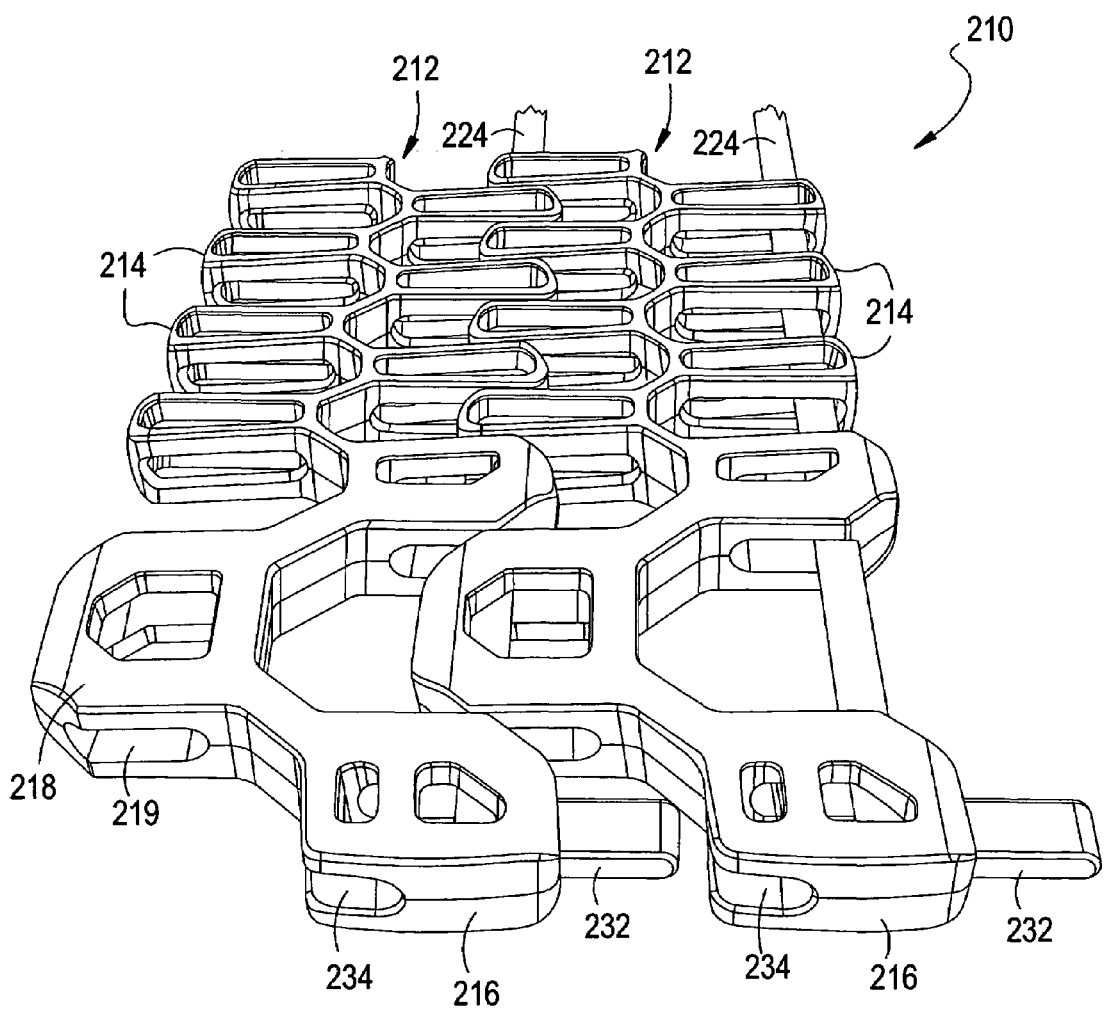
FIG. 10 is a perspective edge view of a segment of a conveyor belt having a pair of link elements in accordance with another embodiment of the present invention.
Figure 11:
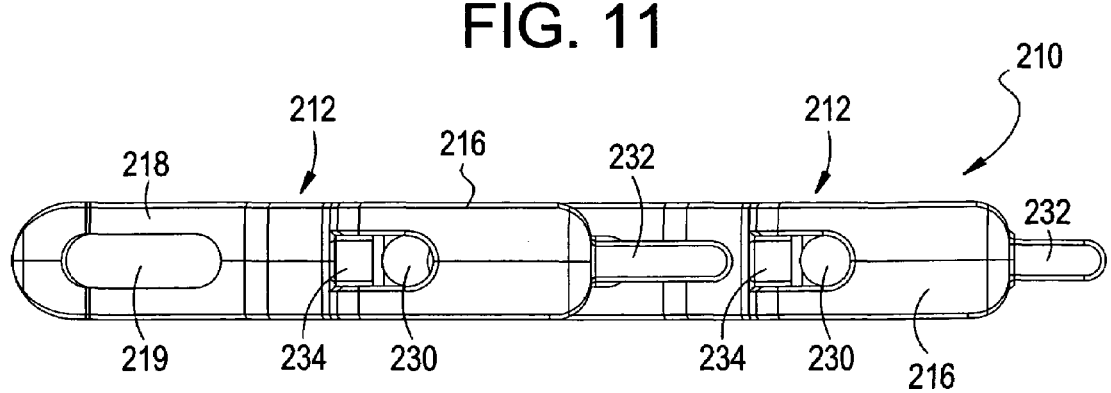
FIG. 11 is an edge view of the conveyor belt shown in FIG. 10.

FIGS. 10 and 11 show perspective and side views of a conveyor belt 210 in accordance with yet another implementation of the present invention. In this regard, conveyor belt 210 is substantially similar to the embodiment shown in the FIGS. 1 to 7 discussed above. Therefore, discussion of the various details of the conveyor belt 210 are omitted herein to avoid repetition. Primary distinction of the conveyor belt 210, as shown in FIGS. 10 and 11, is that the edge extensions 216 of the link elements 212 are provided with protrusions 232 which have a length dimension that is larger than the depth of the receiving slots 234. Thus, when the link elements 212 of the conveyor belt 210 are collapsed together, the protrusion 232 is only partially received within the receiving slot 234 of the adjacent link element 212 thereby preventing full nesting of the link elements 212.

Because the protrusion 232 is longer than the depth dimension of the receiving slot 234, the effective minimum turn radius of the conveyor belt 210 may thus be controlled. In other words, the protrusion 232 limits the extent to which the two adjacent link elements 212 can be collapsed together at the edges thereof. This effectively determines the minimum turn radius for the conveyor belt 210 so that conveyor belts can be specifically designed for applications requiring a particular minimum turn radius. Of course, the conveyor belt 210 shown in FIGS. 10 and 11 is merely one example embodiment and the protrusion 232 may be designed to have a length (relative to the depth of the receiving slot) in accordance with the needs of the specific application for which the conveyor belt 210 is to be applied. The edge extension 216 of the illustrated embodiment is also provided with a receiving slot 234 that is defined by the upper flange 236 and lower flange 238 so as to prevent tenting of the link elements 112 in the manner previously described.

Figure 12:
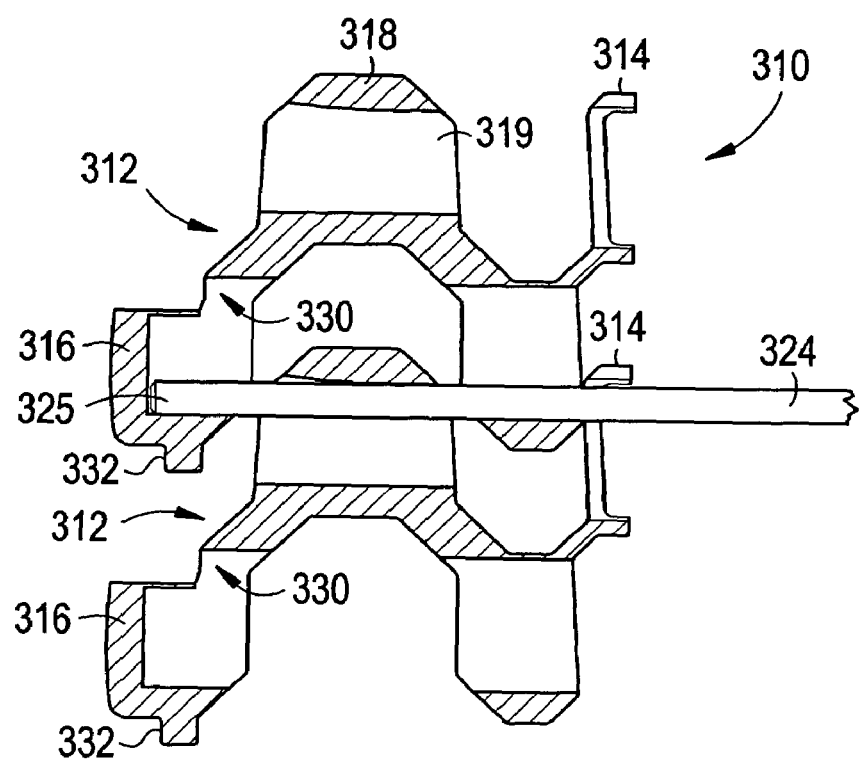
FIG. 12 is a topographical cross sectional view of a segment of a conveyor belt having link elements in accordance with still another embodiment of the present invention.

FIG. 12 is a topographical cross sectional view of a segment of a conveyor belt 310 having link elements 312 in accordance with still another embodiment of the present invention. Again, the conveyor belt 310 is substantially similar to the previously described embodiments discussed above, and, thus, various details are omitted herein to avoid repetition. However, the edge extensions 316 of the link elements 312 are not provided with a receiving slot or flanges that form the slot. Thus, in this embodiment, the protrusions 332 are used to merely block the entry aperture 330 of an adjacent link element 312. Of course, the protrusions 332 may be further elongated in other embodiments to allow further control of the minimum turn radius of the conveyor belt 310. However, it should be evident, in view of the discussion above relative to the other embodiments, that provision of the receiving slot is advantageous, in that, it prevents tenting between the link elements when they are collapsed together.

Figure 13:
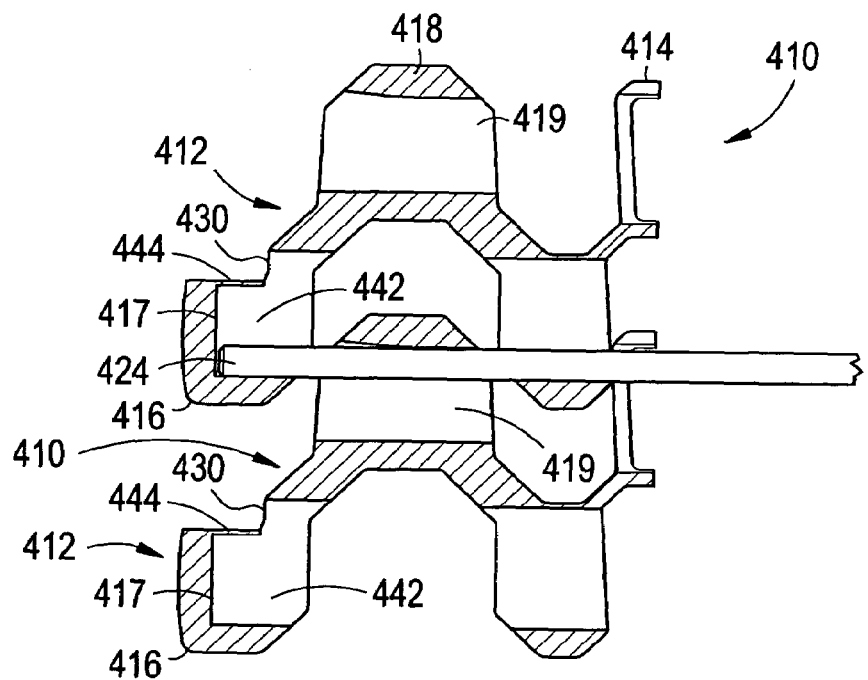
FIG. 13 is a topographical cross sectional view of a segment of a conveyor belt having link elements in accordance with yet another embodiment of the present invention.

FIG. 13 shows a topographical cross sectional view of a segment of a conveyor belt 410 having link elements 412 in accordance with yet another embodiment of the present invention which is somewhat similar to the previously described embodiments discussed above. However, as can be seen in FIG. 13, the edge extensions 416 of the link elements 412 are not provided with the optional protrusions, or a receiving slot. Thus, in this embodiment, the pivot rods 424 are inserted into the entry aperture 430 so as to interconnect adjacent intermeshing link elements 412 together, and are retained in the rod receiving compartment 442 by the transverse obstruction 444 provided on the edge extension 416 of the link elements 412.

As can be appreciated, because protrusions are not provided in the illustrated embodiment of the present invention, the entry apertures 430 are open. Consequently, there exists a potential risk that the pivot rod 424 may move to the entry aperture 430 and be unintentionally removed through the entry aperture 430, thereby disconnecting the link elements 412 and causing the conveyor belt 410 to fail. However, this potential risk is not very high because the transverse obstruction 444 impedes the end of the pivot rod 424 from moving to the entry aperture 430. In addition, as previously described, the pivot rods 424 are correspondingly sized in length so that the pivot rods 424 are slightly longer than the dimension between the ends of the transverse obstructions 444 at the opposite edges of the link element 412, thus, further impeding the removal of the pivot rod when the conveyor belt 410 is in operation. Of course, to further minimize the risk that the pivot rod 424 is unintentionally removed through the entry aperture 430, one of the above described embodiments of the present invention which includes a protrusion that blocks the entry aperture may be utilized.

Figure 14:
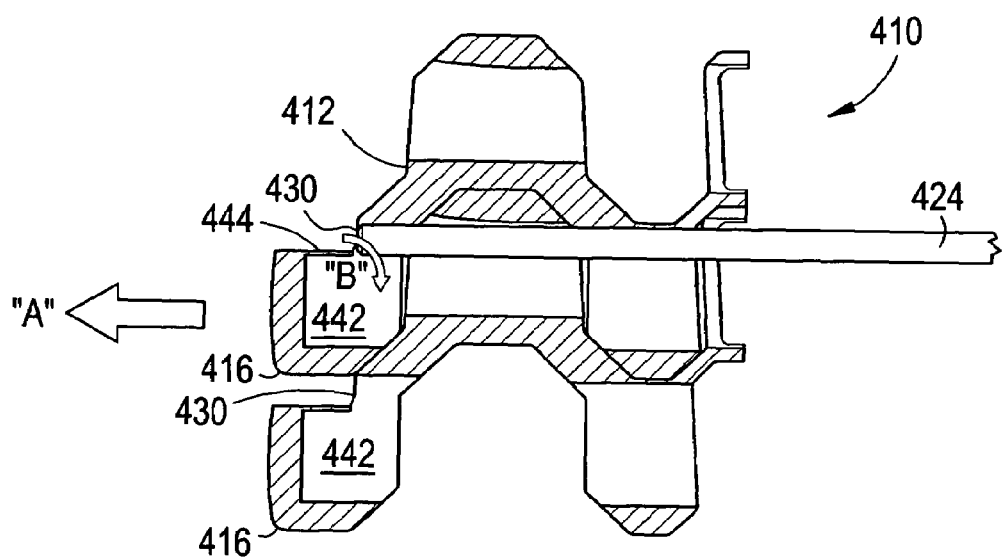
FIG. 14 shows the segment of the conveyor belt of FIG. 13 being assembled in accordance with a method of the present invention.

FIG. 14 shows the segment of the conveyor belt 410 of FIG. 13 discussed above that is being assembled using a method of assembly in accordance with another aspect of the present invention. Initially, adjacent link elements 412 are collapsed together so that the link elements 412 are intermeshed together as shown. Then, the pivot rod 424 is inserted into the entry aperture 430, one end of the pivot rod 424 being received in the rod receiving compartment of an edge extension (not shown) that is provided on the opposite edge of the link elements 412. Due to the length of the pivot rod 424, the other end of the pivot rod 424 that is illustrated in FIG. 14 does not completely clear the transverse obstruction 444 to allow the end of the pivot rod 424 to be moved into the rod receiving compartment 442.

In accordance with the method of the present invention, the intermeshed link elements 412 are then slightly stretched in the direction of arrow "A" so that the transverse width dimension of the link elements 412 are slightly increased. As previously noted, this slight stretching is possible because the link elements 412 are preferably made of a slightly deformable plastic or other appropriate material. This slight stretching of the intermeshed link elements 412 allows the end of the pivot rod 424 to clear the transverse obstruction 444 of edge extension 416, and be moved into the rod receiving compartment 442 as indicated by arrow "B". The intermeshed link elements 412 are then released so that they are no longer stretched and return to their normal size. When the link elements 412 resume their normal transverse width dimension, the end of the pivot rod 424 is fully received within the rod receiving compartment 442 and retained therein by the transverse obstruction 444. The intermeshed link elements 412 can then be extended away from each other as shown in FIG. 13 during use. To remove the pivot rod 424, for example, to service the conveyor belt 410, the steps described above can simply be reversed.

Finally, it should be further noted that in the embodiments of the present invention shown and described above, the entry aperture and the transverse obstruction were provided on the leading end of the edge extensions so that in operation, the pivot rods are moved toward the trailing end of the edge extensions and away from the entry aperture and the transverse obstruction. However, the present invention is not limited thereto, and may be implemented in other embodiments with the entry aperture and the transverse obstruction positioned on the trailing end of the edge extensions. In such embodiments, the transverse obstruction should be implemented as a continuous divider so that the pivot rod cannot be forced through the transverse obstruction and align with the entry aperture.

In view of the above, it should now be evident how the present invention provides a conveyor belt that allows easy installation and retention of the pivot rods. In particular, it should be evident to one of ordinary skill in the art how the conveyor belts of the described embodiments provide integrated solutions to many of the issues associated with the use of such conveyor belts. Furthermore, it should also be evident how conveyor belt in accordance with one embodiment prevents tenting while further providing a mechanism to control the minimum turn radius. Moreover, it should also be evident that a unique and novel method of assembling a conveyor belt is provided.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A conveyor belt comprising:
a plurality of link elements, each link element having a plurality of intermeshing extensions and at least one edge extension at a peripheral edge thereof, said plurality of intermeshing extensions forming receiving compartments adapted to receive intermeshing extensions of an adjacent link element, and including transverse rod openings; and
a plurality of pivot rods received in said transverse rod openings of said plurality of intermeshing extensions thereby interconnecting adjacent link elements together;
wherein said at least one edge extension of said plurality of link elements includes an entry aperture sized to allow insertion of a pivot rod through said at least one edge extension, and a protrusion that extends to block an entry aperture of an adjacent link element to retain a pivot rod that interlinks a pair of link elements other than said link element on which said protrusion is provided.

2. The conveyor belt of claim 1, wherein at least some of said transverse rod openings are slotted openings to allow said plurality of link elements of said conveyor belt to be collapsed together.

3. The conveyor belt of claim 1, wherein said at least one edge extension further includes a rod receiving compartment for receiving an end of a pivot rod therein.

4. The conveyor belt of claim 3, wherein said at least one edge extension further includes a transverse obstruction that at least partially defines said rod receiving compartment.

5. The conveyor belt of claim 4, wherein said obstruction is a continuous divider.

6. The conveyor belt of claim 4, wherein said obstruction is at least one projection.

7. The conveyor belt of claim 1, further comprising a drive extension with a rod drive opening and a transverse slotted opening having a curved rod surface that receives a pivot rod therethrough.

8. The conveyor belt of claim 1, wherein said at least one edge extension includes at least one surface opening sized to show at least a portion of said pivot rod when said pivot rod is retained.

9. The conveyor belt of claim 1, wherein said at least one edge extension includes at least one surface opening positioned above said entry aperture.

10. A conveyor belt comprising:
a plurality of link elements, each link element having a plurality of intermeshing extensions and at least one edge extension at a peripheral edge thereof, said plurality of intermeshing extensions forming receiving compartments adapted to receive intermeshing extensions of an adjacent link element, and including transverse rod openings; and
a plurality of pivot rods received in said transverse rod openings intermeshing extensions thereby interconnecting adjacent link elements together;
wherein said at least one edge extension of said plurality of link elements includes an entry aperture sized to allow insertion of a pivot rod through said at least one edge extension, and a protrusion that extends to block an entry aperture of an adjacent link element to retain a pivot rod that interlinks a pair of link elements other than said link element on which said protrusion is provided:
wherein at least some of said transverse rod openings are slotted openings to allow said plurality of link elements of said conveyor belt to be collapsed together:
wherein said at least one edge extension further includes a receiving slot defined by an upper flange and a lower flange, said receiving slot being sized to receive a protrusion of an adjacent link element when said link elements are collapsed together.

11. The conveyor belt of claim 10, wherein said protrusion is longer than a depth dimension of said receiving slot.

12. A conveyor belt comprising:
a plurality of link elements, each link element having a plurality of intermeshing extensions and at least one edge extension at a peripheral edge thereof, said plurality of intermeshing extensions forming receiving compartments adapted to receive intermeshing extensions of an adjacent link element, and including transverse rod openings; and a plurality of pivot rods received in said transverse rod openings intermeshing extensions thereby interconnecting adjacent link elements together;

wherein said at least one edge extension of said plurality of link elements includes an entry aperture sized to allow insertion of a pivot rod through said at least one edge extension, and a protrusion that extends to block an entry aperture of an adjacent link element to retain a pivot rod that interlinks a pair of link elements other than said link element on which said protrusion is provided;

wherein said at least one edge extension further includes a rod receiving compartment for receiving an end of a pivot rod therein, and a transverse obstruction that at least partially defines said rod receiving compartment;

wherein said obstruction is at least one projection;

wherein said projection is curved with a radius that is substantially the same as a radius of said pivot rod.

13. A conveyor belt comprising:
a plurality of link elements, each link element including:
a plurality of intermeshing extensions that form receiving compartments adapted to receive intermeshing extensions of an adjacent link element, each of said plurality of intermeshing extensions including a transverse rod opening therethrough, at least some of said transverse rod openings being slotted openings to allow said plurality of link elements of said conveyor belt to be collapsed together; and
at least one edge extension at a peripheral edge of said link element, said at least one edge extension including a protrusion and a receiving slot sized to receive a protrusion of an adjacent link element to interlock adjacent link elements together when said link elements are collapsed together; and
a plurality of pivot rods received in said rod openings of said plurality of intermeshing extensions thereby interconnecting adjacent link elements together;
wherein said at least one edge extension includes a rod receiving compartment for receiving an end of a pivot rod therein.

14. The conveyor belt of claim 13, wherein said protrusion extends in to said receiving slot to block an entry aperture of an adjacent link element to retain a pivot rod when adjacent link elements are collapsed together.

15. The conveyor belt of claim 14, wherein said pivot rod that is retained by said protrusion interconnects a pair of link elements other than said link element on which said protrusion is provided.

16. The conveyor belt of claim 13, wherein said at least one edge extension further includes an entry aperture positioned in said receiving slot, said entry aperture being sized to allow insertion of a pivot rod through said at least one edge extension and said rod openings of a pair of adjacent link elements.

17. The conveyor belt of claim 13, wherein said at least one edge extension further includes a transverse obstruction that at least partially defines said rod receiving compartment.

18. The conveyor belt of claim 17, wherein said obstruction is a continuous divider.

19. The conveyor belt of claim 17, wherein said obstruction is at least one projection.

20. The conveyor belt of claim 13, wherein said at least one edge extension includes at least one surface opening.

21. The conveyor belt of claim 13, wherein said protrusion is longer than a depth dimension of said receiving slot.

22. The conveyor belt of claim 13, further comprising a drive extension with a rod drive opening and a transverse slotted opening having a curved rod surface for receiving a pivot rod therethrough.

23. A conveyor belt comprising:
a plurality of link elements, each link element including:
a plurality of intermeshing extensions that form receiving compartments adapted to receive intermeshing extensions of an adjacent link element, each of said plurality of intermeshing extensions including a transverse rod opening therethrough at least some of said transverse rod openings being slotted openings to allow said plurality of link elements of said conveyor belt to be collapsed together; and
at least one edge extension at a peripheral edge of said link element, said at least one edge extension including a protrusion and a receiving slot sized to receive a protrusion of an adjacent link element to interlock adjacent link elements together when said link elements are collapsed together; and
a plurality of pivot rods received in said rod openings of said plurality of intermeshing extensions thereby interconnecting adjacent link elements together:
wherein said receiving slot is defined by an upper flange and a lower flange.

24. A conveyor belt comprising:
a plurality of link elements, each link element including:
a plurality of intermeshing extensions that form receiving compartments adapted to receive intermeshing extensions of an adjacent link element, each of said plurality of intermeshing extensions including a transverse rod opening therethrough, at least some of said transverse rod openings being slotted openings to allow said plurality of link elements of said conveyor belt to be collapsed together; and
at least one edge extension at a peripheral edge of said link element, said at least one edge extension including a protrusion and a receiving slot sized to receive a protrusion of an adjacent link element to interlock adjacent link elements together when said link elements are collapsed together; and
a plurality of pivot rods received in said rod openings of said plurality of intermeshing extensions thereby interconnecting adjacent link elements together;
wherein said at least one edge extension includes a rod receiving compartment for receiving an end of a pivot rod therein;
wherein said at least one edge extension further includes a transverse obstruction that at least partially defines said rod receiving compartment;
wherein said obstruction is at least one projection;
wherein said at least one projection is curved with a radius that is substantially the same as a radius of said pivot rod.

25. A conveyor belt comprising:
a plurality of link elements, each link element including:
a plurality of intermeshing extensions that form receiving compartments adapted to receive intermeshing extensions of an adjacent link element, each of said plurality of intermeshing extensions including a transverse rod opening therethrough, at least some of said transverse rod openings being slotted openings to allow said plurality of link elements of said conveyor belt to be collapsed together; and
at least one edge extension at a peripheral edge of said link element, said at least one edge extension including a protrusion that abuts against the adjacent link element to thereby limit the extent to which said link elements of said peripheral edge of said conveyor belt are collapsed and defining a minimum turn radius of said conveyor belt; and a plurality of pivot rods received in said rod openings of said plurality of intermeshing extensions thereby interconnecting adjacent link elements together.

26. The conveyor belt of claim 25, wherein said at least one edge extension includes at least one surface opening.

27. A conveyor belt comprising:
a plurality of link elements, each link element including:
a plurality of intermeshing extensions that form receiving compartments adapted to receive intermeshing extensions of an adjacent link element, each of said plurality of intermeshing extensions including a transverse rod opening therethrough, at least some of said transverse rod openings being slotted openings to allow said plurality of link elements of said conveyor belt to be collapsed together; and
at least one edge extension at a peripheral edge of said link element, said at least one edge extension including a protrusion that limits the extent to which said link elements of said peripheral edge of said conveyor belt are collapsed thereby defining a minimum turn radius of said conveyor belt; and
a plurality of pivot rods received in said rod openings of said plurality of intermeshing extensions thereby interconnecting adjacent link elements together;
wherein said at least one edge extension further includes a receiving slot sized to receive a protrusion of an adjacent link element when said link elements are collapsed together to interlock adjacent link elements together so as to resist tenting when said link elements are collapsed together.

28. The conveyor belt of claim 27, wherein said protrusion is longer than a depth dimension of said receiving slot.

29. A conveyor belt comprising:
a plurality of link elements, each link element including:
a plurality of intermeshing extensions that form receiving compartments adapted to receive intermeshing extensions of an adjacent link element, said plurality of intermeshing extensions including transverse rod openings therethrough, at least some of said transverse rod openings being slotted openings; and
at least one edge extension at a peripheral edge thereof, said at least one edge extension including a protrusion and an entry aperture sized to allow insertion of a pivot rod through said at least one edge extension; and
a plurality of pivot rods received in said rod openings of said plurality of intermeshing extensions thereby interconnecting adjacent link elements together;
wherein said protrusion of said at least one edge extension prevents removal of a pivot rod when said link elements are collapsed together, and are sized to allow the removal of said pivot rod when adjacent link elements are extended away from each other.

30. The conveyor belt of claim 29, wherein said protrusion extends to block an entry aperture to retain said pivot rod, said pivot rod interconnecting a pair of link elements other than said link element on which said protrusion is provided.

31. The conveyor belt of claim 29, wherein said at least one edge extension further includes a rod receiving compartment for receiving an end of said pivot rod therein.

32. The conveyor belt of claim 29, wherein said at least one edge extension further includes a transverse obstruction that at least partially defines said rod receiving compartment.

33. The conveyor belt of claim 29, wherein said at least one edge extension includes at least one surface opening sized to show at least a portion of said pivot rod when said pivot rod is retained.

34. The conveyor belt of claim 29, wherein said at least one edge extension includes at least one surface opening positioned above said entry aperture.

35. A conveyor belt comprising:
a plurality of link elements, each link element including:
a plurality of intermeshing extensions that form receiving compartments adapted to receive intermeshing extensions of an adjacent link element, said plurality of intermeshing extensions including transverse rod openings therethrough, at least some of said transverse rod openings being slotted openings; and
at least one edge extension at a peripheral edge thereof, said at least one edge extension including a protrusion and an entry aperture sized to allow insertion of a pivot rod through said at least one edge extension; and
a plurality of pivot rods received in said rod openings of said plurality of intermeshing extensions thereby interconnecting adjacent link elements together:
wherein said protrusion of said at least one edge extension prevents removal of a pivot rod when said link elements are collapsed together:
wherein said at least one edge extension further includes a receiving slot defined by an upper flange and a lower flange, said receiving slot being sized to receive a protrusion of an adjacent link element when said link elements are collapsed together.

36. A conveyor belt comprising:
a plurality of link elements, each link element having a plurality of intermeshing extensions and at least one edge extension at a peripheral edge thereof, said plurality of intermeshing extensions forming receiving compartments adapted to receive intermeshing extensions of an adjacent link element, and including transverse rod openings; and
a plurality of pivot rods received in said transverse rod openings of said plurality of intermeshing extensions thereby interconnecting adjacent link elements together;
wherein said at least one edge extension of at least one of said plurality of link elements includes an entry aperture sized to allow insertion of a pivot rod through said at least one edge extension, and a transverse obstruction that at least partially defines a rod receiving compartment for receiving an end of said pivot rod therein, said transverse obstruction extending in a transverse direction that is parallel to a width of said conveyor belt, and preventing said end of said pivot rod from being forced into said rod receiving compartment from said entry aperture.

37. The conveyor belt of claim 36, wherein said obstruction is a continuous divider.

38. The conveyor belt of claim 36, wherein said obstruction is at least one projection.

39. The conveyor belt of claim 36, wherein said obstruction transversely extends widthwise across only a portion of the width of said at least one edge extension.

40. The conveyor belt of claim 36, wherein at least some of said transverse rod openings are slotted openings to allow said plurality of link elements of said conveyor belt to be collapsed together.

41. The conveyor belt of claim 36, further including a protrusion positioned on said at least one edge extension that extends to block an entry aperture of an adjacent link element.

42. The conveyor belt of claim 36, wherein said at least one edge extension includes at least one surface opening sized to show at least a portion of said pivot rod when said pivot rod is retained.

43. The conveyor belt of claim 36, wherein said at least one edge extension includes at least one, surface opening positioned above said entry aperture.

44. A conveyor belt comprising:
a plurality of link elements, each link element having a plurality of intermeshing extensions and at least one edge extension at a peripheral edge thereof, said plurality of intermeshing extensions forming receiving compartments adapted to receive intermeshing extensions of an adjacent link element, and including transverse rod openings; and
a plurality of pivot rods received in said transverse rod openings intermeshing extensions thereby interconnecting adjacent link elements together:
wherein said at least one edge extension of at least one of said plurality of link elements includes an entry aperture sized to allow insertion of a pivot rod through said at least one edge extension, and a transverse obstruction that at least partially defines a rod receiving compartment for receiving an end of said pivot rod therein, said transverse obstruction preventing said end of said pivot rod from being forced into said rod receiving compartment from said entry aperture;
wherein said obstruction is at least one projection;
wherein said projection is curved with a radius that is substantially the same as a radius of said pivot rod.

45. A conveyor belt comprising:
a plurality of link elements, each link element having a plurality of intermeshing extensions and at least one edge extension at a peripheral edge thereof, said plurality of intermeshing extensions forming receiving compartments adapted to receive intermeshing extensions of an adjacent link element, and including transverse rod openings; and
a plurality of pivot rods received in said transverse rod openings intermeshing extensions thereby interconnecting adjacent link elements together;
wherein said at least one edge extension of at least one of said plurality of link elements includes an entry aperture sized to allow insertion of a pivot rod through said at least one edge extension, and a transverse obstruction that at least partially defines a rod receiving compartment for receiving an end of said pivot rod therein, said transverse obstruction preventing said end of said pivot rod from being forced into said rod receiving compartment from said entry aperture;
wherein said obstruction transversely extends widthwise across the full width of said at least one edge extension.

46. A conveyor belt comprising:
a plurality of link elements, each link element having a plurality of intermeshing extensions and at least one edge extension at a peripheral edge thereof, said plurality of intermeshing extensions forming receiving compartments adapted to receive intermeshing extensions of an adjacent link element, and including transverse rod openings; and
a plurality of pivot rods received in said transverse rod openings of said plurality of intermeshing extensions thereby interconnecting adjacent link elements together;
wherein said at least one edge extension of at least one of said plurality of link elements includes an entry aperture sized to allow insertion of a pivot rod through said at least one edge extension, and a transverse obstruction that at least partially defines a rod receiving compartment for receiving an end of said pivot rod therein, said transverse obstruction preventing said end of said pivot rod from being forced into said rod receiving compartment from said entry aperture;
wherein said at least one of said plurality of link elements is adapted to be stretched transversely to allow said end of said pivot rod to clear said transverse obstruction so that said pivot rod is moveable into said receiving compartment.

47. A conveyor belt comprising:
a plurality of link elements, each link element having a plurality of intermeshing extensions and at least one edge extension at a peripheral edge thereof, said plurality of intermeshing extensions forming receiving compartments adapted to receive intermeshing extensions of an adjacent link element, and including transverse rod openings; and
a plurality of pivot rods received in said transverse rod openings intermeshing extensions thereby interconnecting adjacent link elements together:
wherein said at least one edge extension of at least one of said plurality of link elements includes an entry aperture sized to allow insertion of a pivot rod through said at least one edge extension, and a transverse obstruction that at least partially defines a rod receiving compartment for receiving an end of said pivot rod therein, said transverse obstruction preventing said end of said pivot rod from being forced into said rod receiving compartment from said entry aperture;
further including a protrusion positioned on said at least one edge extension that extends to block an entry aperture of an adjacent link element;
wherein said at least one edge extension further includes a receiving slot defined by an upper flange and a lower flange, said receiving slot being sized to receive a protrusion of an adjacent link element when said link elements are collapsed together.

48. A conveyor belt comprising:
a plurality of link elements, each link element having a plurality of intermeshing extensions and at least one edge extension at a peripheral edge thereof, said plurality of intermeshing extensions forming receiving compartments adapted to receive intermeshing extensions of an adjacent link element, and including transverse rod openings, said transverse rod openings of at least some of said plurality of intermeshing extensions being slots; and
a plurality of pivot rods received in said transverse rod openings of said plurality of intermeshing extensions thereby interconnecting adjacent link elements together;
wherein said at least one edge extension of at least one of said plurality of link elements includes an entry aperture sized to allow insertion of a pivot rod through said at least one edge extension, and a transverse obstruction that extends in a transverse direction that is parallel to a width of the conveyor belt, and at least partially defines a rod receiving compartment for receiving an end of said pivot rod therein, said rod receiving compartment being larger than said end of said pivot rod to allow said end of said pivot rod to be displaced therein.

49. The conveyor belt of claim 48, wherein said at least one edge extension includes at least one surface opening.

50. A method of assembling a conveyor belt comprising the steps of:
providing a plurality of link elements, each link element having a plurality of intermeshing extensions with transverse rod openings, and at least one edge extension at a peripheral edge thereof, said at least one edge extension including an entry aperture and a transverse obstruction that at least partially defines a rod receiving compartment;
providing a plurality of pivot rods;
intermeshing a pair of adjacent link elements together;
inserting a pivot rod through said entry aperture of one of said intermeshed pair of link elements and through said transverse rod openings of said intermeshed pair of link elements to thereby interconnect said intermeshed pair of link elements together;
transversely stretching said intermeshed pair of link elements to allow an end of said pivot rod to clear said transverse obstruction; and
moving said end of said pivot rod into said receiving compartment.

51. The method of claim 50, further including the step of releasing said stretched intermeshed pair of link elements to allow said pair of link elements to return to normal size.

52. The method of claim 50, wherein said obstruction is a continuous divider.

53. The method of claim 50, wherein said obstruction is at least one projection.

54. The method of claim 50, wherein said at least one edge extension includes at least one surface opening sized to show at least a portion of said pivot rod when said pivot rod is received in said rod receiving compartment.

55. The method of claim 50, wherein said at least one edge extension includes at least one surface opening positioned above said entry aperture.

\* \* \* \* \*